United States Patent
Ganu et al.

(10) Patent No.: US 10,524,160 B2
(45) Date of Patent: *Dec. 31, 2019

(54) BALANCING LOAD ACROSS RADIO FREQUENCY CHANNELS

(71) Applicant: Hewlett Packard Enterprise Development LP, Houston, TX (US)

(72) Inventors: Sachin Ganu, San Jose, CA (US); Pradeep Iyer, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,733

(22) Filed: May 9, 2018

(65) Prior Publication Data

US 2018/0262946 A1    Sep. 13, 2018

Related U.S. Application Data

(63) Continuation of application No. 14/275,697, filed on May 12, 2014, now Pat. No. 9,980,174, which is a continuation of application No. 13/269,202, filed on Oct. 7, 2011, now Pat. No. 8,724,606.

(51) Int. Cl.
| | |
|---|---|
| *H04W 28/02* | (2009.01) |
| *H04L 12/863* | (2013.01) |
| *H04W 72/04* | (2009.01) |
| *H04W 28/08* | (2009.01) |
| *H04W 48/12* | (2009.01) |
| *H04W 16/08* | (2009.01) |

(52) U.S. Cl.
CPC ....... *H04W 28/0289* (2013.01); *H04L 47/626* (2013.01); *H04W 16/08* (2013.01); *H04W 28/08* (2013.01); *H04W 48/12* (2013.01); *H04W 72/0486* (2013.01)

(58) Field of Classification Search
CPC . H04W 28/0289; H04W 16/08; H04W 28/08; H04W 48/12; H04W 72/0486; H04L 47/626
USPC ..................................................... 370/338
See application file for complete search history.

(56) References Cited

U.S. PATENT DOCUMENTS

| | | | |
|---|---|---|---|
| 6,219,343 B1 | 4/2001 | Honkasalo et al. | |
| 7,633,940 B1 | 12/2009 | Singh et al. | |
| 2003/0134642 A1 | 7/2003 | Kostic et al. | |
| 2004/0208126 A1* | 10/2004 | Wassew | H04L 47/10 370/235 |
| 2005/0059396 A1 | 3/2005 | Chuah et al. | |

(Continued)

*Primary Examiner* — Ricky Q Ngo
*Assistant Examiner* — Ellen A Kirillova
(74) *Attorney, Agent, or Firm* — Hewlett Packard Enterprise Patent Department (57) ABSTRACT

The present disclosure discloses a network device and method for advertising channel load. The disclosed network device aggregates a number of clients that are associated with the network device on a specific wireless communication channel, and advertises the aggregated number to a client on the specific wireless communication channel. Further, the network device can receive aggregated load information on the specific wireless communication channel from another management network device, and further aggregates the load information across multiple wireless networks operating on the same wireless communication channel and coupled to different management network devices.

18 Claims, 7 Drawing Sheets

(56) References Cited

U.S. PATENT DOCUMENTS

| | | |
|---|---|---|
| 2005/0215265 A1* | 9/2005 | Sharma ............... H04L 47/125 |
| | | 455/453 |
| 2005/0265283 A1 | 12/2005 | Qi et al. |
| 2006/0072581 A1 | 4/2006 | Olariu et al. |
| 2006/0114881 A1 | 6/2006 | Chari et al. |
| 2007/0248033 A1 | 10/2007 | Bejerano et al. |
| 2007/0248035 A1* | 10/2007 | Sang ................. H04W 52/346 |
| | | 370/318 |
| 2008/0144586 A1 | 6/2008 | Kneckt et al. |
| 2009/0061799 A1* | 3/2009 | Park ................ H04W 52/0258 |
| | | 455/127.5 |
| 2010/0232390 A1* | 9/2010 | Varma .............. H04W 72/0486 |
| | | 370/331 |
| 2011/0032909 A1 | 2/2011 | Park et al. |
| 2011/0122780 A1 | 5/2011 | Nieminen et al. |
| 2012/0142392 A1* | 6/2012 | Patel ................. H04W 52/143 |
| | | 455/522 |
| 2012/0233492 A1 | 9/2012 | Finn et al. |

* cited by examiner

FIG. 1

| Element ID 210 | Length 220 | Station Count 230 | Channel Utilization 240 | Available Admission Capacity 250 |
|---|---|---|---|---|
| 1 | 1 | 2 | 1 | 2 |

BALANCING LOAD ACROSS RADIO FREQUENCY CHANNELS

BENEFIT CLAIM; INCORPORATION BY REFERENCE; DISCLAIMER

This application is a Continuation of U.S. application Ser. No. 14/275,697 filed on May 12 2014, which is a Continuation of U.S. application Ser. No. 13/269,202 filed on Oct. 7, 2011, all of which is hereby incorporated by reference. The applicant(s) hereby rescind any disclaimer of claim scope in the parent application(s) or the prosecution history thereof and advice the USPTO that the claims in this application may be broader than any claim in the parent application(s).

BACKGROUND OF THE INVENTION

The present disclosure relates to channel management in a wireless digital network. In particular, the present disclosure relates to channel load advertisement to network devices in wireless networks.

Wireless networks, such as networks operating under institute of Electrical and Electronics Engineers (IEEE) 802.11 standards, are spreading in their popularity and availability. With such popularity, however, come problems of communication channel management. Specifically, since many clients on the same wireless communication channel may share and compete for channel access, network performance typically depends on the number of clients that share the wireless communication channel within a given radio frequency neighborhood. Thus, it is advantageous to distribute clients to span across different wireless communication channels in a given radio frequency neighborhood.

IEEE 802.11 standard has established a task group, 802.11e, to cope with the needs of real time traffic over wireless networks, including Quality of Service (QoS) demanding services such as Video on demand, Voice over IP (VoIP), gaming, etc. IEEE 802.11e standard extends the existing IEEE 802.11 standard by adding new functions targeting both differentiated and integrated services. The QoS enhanced network devices in compliance with IEEE 802.11e standard can cope with real-time traffic that is delay-sensitive, jitter-sensitive, error-prone, etc., such as voice and video streams.

IEEE 802.11e standard includes an element, i.e., QoS enhanced basic service set (QBSS), which is a part of beacon frames generated by QoS enhanced network devices and contains information on current traffic situation. Nevertheless, the information on the current traffic situation in the QBSS element usually cannot accurate reflect the load of a given wireless communication channel. Therefore, it is advantageous to provide an improved way of calculating channel load in a given neighborhood and advertising it through, for example, a QBSS element under IEEE 802.11e standard.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to channel management in a wireless digital network and, particularly, to the advertisement of wireless communication channel loads to wireless stations or clients in wireless networks. Embodiments of the present disclosure provide a solution that both complies with requirements by wireless technology standards and improves accuracy in the networks advertisements of wireless communication channel loads. With the solution provided herein, a network device, such as an access point, advertises channel loads periodically, and optionally receives a request from a client on a specific wireless communication channel and responds to the request. The network device can aggregate a number of a plurality of clients on one or more wireless networks that are associated with the network device on the specific wireless communication channel, and advertise the aggregated number to a client that is associated with the network device or that is capable of associating within the network device on the specific wireless communication channel.

In some embodiments, the network device transmits or advertises in a message the aggregated number of clients associated with the network device via one or more wireless networks on the specific wireless communication channel to another network device, and/or receives a second aggregated number from the other network device. In one embodiment, the second aggregated number indicates the total number of clients associated with the other network device via one or more wireless networks on the specific wireless communication channel. In some embodiments, after the network device receives the second aggregated number from the other network device. The network device aggregates both aggregated numbers to generate a third aggregated number, which indicates the total number of clients that are associated on one or more wireless network with either network device on the specific wireless communication channel.

Moreover, the network device may advertise the third aggregated number to the other network device in a different message such that the other network device can advertise the third aggregated number in place of the second aggregated number to its clients on the specific wireless communication channel. Note that, because the third aggregated number is advertised in a different message, the other network device will be properly notified that the third number is the aggregation of the first aggregated number and the second aggregated number, and thus will not misinterpret the third aggregated number as the first number and will not further aggregate the third aggregated number with the second aggregated number.

Computing Environment

Figure 1:
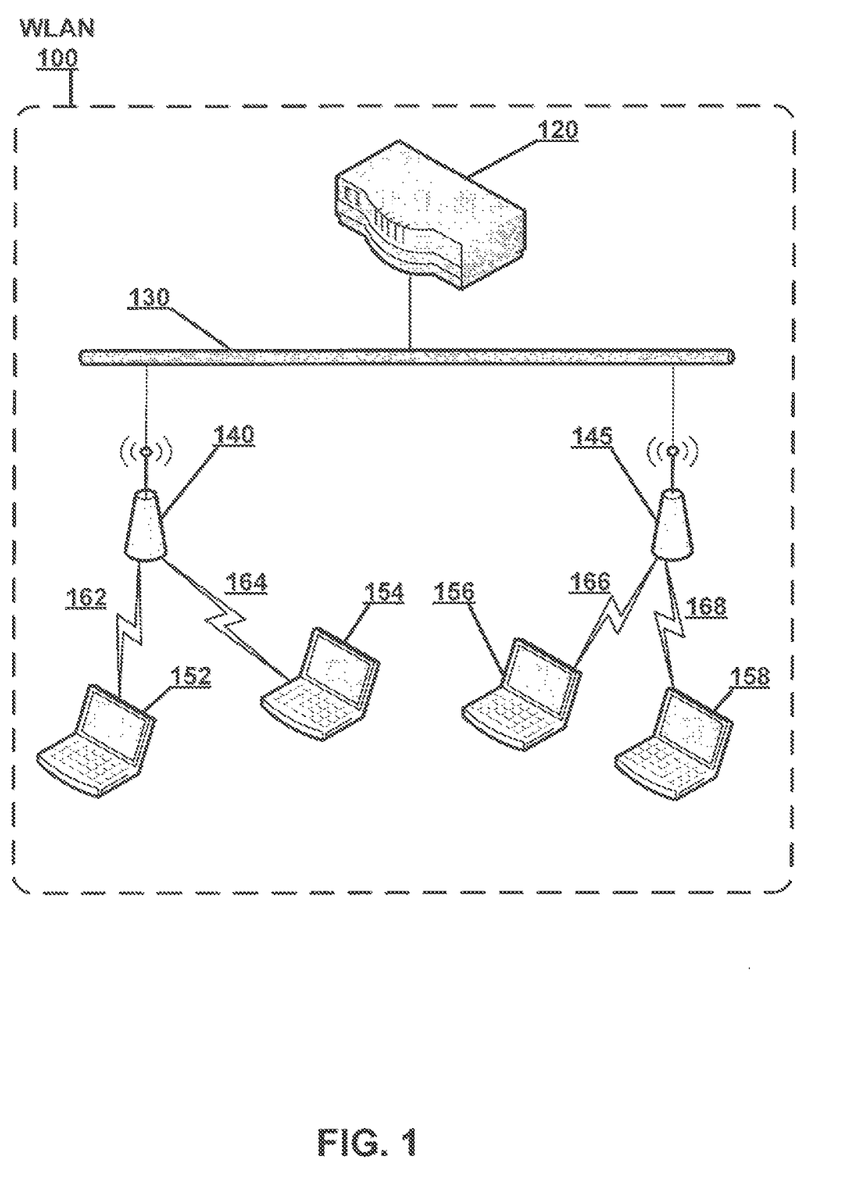
FIG. 1 shows an exemplary wireless digital network environment according to embodiments of the present disclosure.

FIG. 1 shows an exemplary wireless digital network environment according to embodiments of the present disclosure. FIG. 1 includes wireless local area network (WLAN) 100, and optionally network controller 120, which are coupled to other network devices, such as access point 140 and access point 145 via wired network 130. Also, access point 140 can be coupled to one or more client devices 152 and 154 via wireless communication links 162 and 164 respectively. Likewise, access point 145 can be coupled to one or more client devices 156 and 158 via wireless communication links 166 and 168 respectively.

Access points 140 and 145 are hardware units that act as communication nodes by linking wireless mobile stations, such as personal computers, to a wired backbone network. Access point 140 or 145 may connect client devices or users to other client devices or users in the network. Also, access point 140 or 145 may serve as a point of connection between WLAN 100 and wired network 130.

Access point 140 or 145 may generally broadcast a service set identifier (SSID). In particular, access point 140 or 145 may be quality of service (QoS) enhanced access points that are capable of broadcasting QoS basic service set (QBSS). Specifically, additional information, such as QBSS parameters, may be added to the beacon frames or probe requests/response to advertise channel load information. Such additional information allows access points 140 and/or 145 to deckle whether to accept an admission control request. The additional information also allows wireless devices 152-158 to decide which of the available access points 140 and 145 they should choose to associate with.

Access point 140 or 145 may have one or more radios. The radios may be configured to communicate with various wireless devices is wireless links 162-168, which support wireless communication standards. In particular, the radios may include multiple antennas to support Institute of Electrical and Electronics Engineers (IEEE) 802.11 wireless networking standards, Worldwide Interoperability for Microwave Access standards (WiMAX), 4th Generation cellular wireless standards (4G), 3rd Generation Partnership Project Long Term Evolution (3GPP LTE), and Evolved High-Speed Packet Access (HSPA+).

In some embodiments, access point 140 or 145 performs media access control (MAC) processing functions. In some embodiments, controller 120 performs some MAC processing functions. In some embodiments, the MAC processing functions are split between access points 140 and/or 145 and controller 120. The MAC processing functions include, for example, terminating the wireless transmission data and management protocols, translating data between the wired and wireless portions of the network, maintaining statistical information regarding wireless clients and the radio environment, and so on.

Wireless clients 152-158 may be any computing device that includes a network communication interlace, which is capable of wireless communications. For example, wireless clients 152-158 can be, but are not limited to, smart mobile phone, laptop or tablet computing device, personal desktop or work station, etc.

Wired network 130 generally include any type of network which involves transmission of data over a wire-based communication technology, for example, Ethernet, fiber-optic communication networks, cable networks, telephone networks, electromagnetic networks, etc.

Network controller 120 can be any hardware or software module or any combination thereof, which provides one or more of such functionalities as network configuration, network performance monitoring, network security, network fault management, network accounting management, etc. Note that, although only one controller is depicted in FIG. 1A, a network in accordance with the present disclosure may include multiple controllers which collaboratively manage a plurality of network devices such as access points. Moreover, when a network includes multiple controllers, one controller may be elected or selected as a master controller to manage other controllers. Also, note that controller 120 can be a virtual controller, which operates on one or more access points in a wireless network. The virtual controller may be elected among the one or more access points or configured by a network administrator.

Channel Load Advertisement

In wireless networks, load distribution usually adopts either a network-based approach or a wireless station-based approach. In the network-based approach, an access point can control its channel load level via mechanisms, such as, coverage adjustment, admission control, and/or association management. With coverage adjustment, a crowded access point may reduce its transmission power of the beacon signals such that new wireless stations are less likely to discover the crowded access point. With admission control, an overloaded access point may reject new association requests. With association management, a crowded access point may send an unsolicited disassociation frame to selected wireless stations that are already associated with the access point, and encourage these wireless stations to re-associate with other access points in the wireless network.

In the wireless station-based approach, a wireless station acquire the load condition of access points in the wireless network, and select an access point that improves the wireless station's benefits to associate with. The load condition of the access points may be acquired by a wireless station either through measuring channel utilization or delay between the scheduled and actual transmission time of periodic beacon frames, or through receiving current channel load or traffic level in probe responses and/or beacon frames transmitted by the access points.

In some embodiments, the above-mentioned channel load or traffic level can be transmitted in QBSS parameters as specified in the IEEE 802.11e standard. IEEE 802.11e standard is an exemplary wireless standard that defines MAC procedures to support local area network (LAN) applications with quality of service (QoS) requirements, including the transport of voice, audio, and video over a wireless LAN (WLAN) that complies with the IEEE 802.11 standard. In a QoS basic service set (QBSS) architecture, the QoS enhancements are available to QoS stations (QSTAs) associated with a QoS access point (QAP). Moreover, the QSTA may associate with a non-QoS access point in a non-QoS basic service set (nQBSS) to provide non-QoS MAC data service when there is no QBSS to associate with.

IEEE 802.11e standard introduces a new element called the QoS enhanced basic service set (QBSS) load element.

Figure 2:
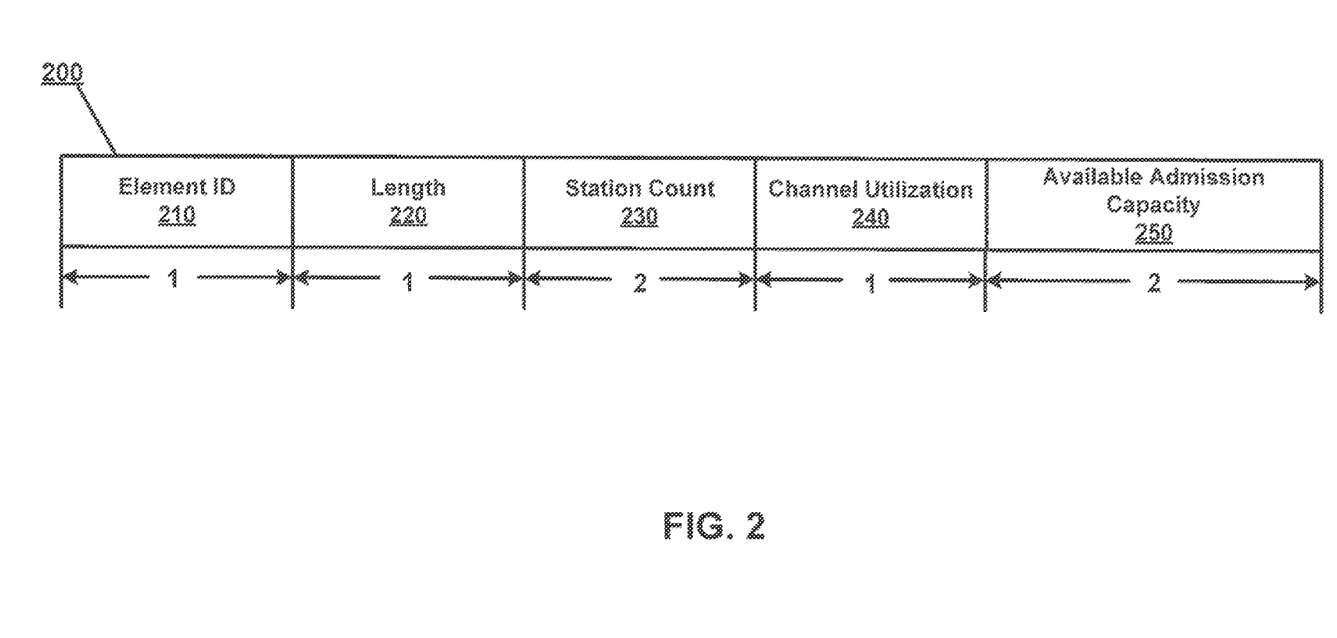
FIG. 2 shows an exemplary portion of a wireless frame according to embodiments of the present disclosure.

FIG. 2 shows an exemplary portion of a wireless frame according to embodiments of the present disclosure. Portion 200 of the wireless frame depicted in FIG. 2 includes element identifier 210, length 220, station count 230, channel utilization 240, and available admission capacity 250.

In some embodiments, portion 200 is compatible with the QBSS load element specified by the IEEE 802.11e standard. Like the QBSS load element, portion 200 contains information on the current wireless station population and traffic levels in the QoS network. Specifically, element identifier (element ID) 210 is a one-octet field that identifies the QBSS load element. Length 220 is a one-octet field that indicates the length of the element.

Station count 230 is a two octet field that indicates the total number of wireless stations currently associated with the QBSS.

Channel utilization 240 is a one-octet field that is defined as the percentage of time (normalized to 255) that a QoS-enhanced access point senses that the channel medium Is busy using either the physical or virtual carrier sense mechanism of the QoS-enhanced access point. The percentage can be computed using the formula:

$$Channel\_busy\_time/(channel\_utilization\_beacon\_intervals*beacon\_period*1024)*255$$

Channel_busy_time is defined to be the number of microseconds during which the carrier sense mechanism has indicated a channel busy indication. The channel_utilization_beacon_intervals represents the number of consecutive beacon intervals during which the channel busy time is measured.

Furthermore, available admission capacity 250 is a two-octet field that indicates the amount of time that can be used by explicit admission control. This field is helpful for roaming non access QSTAs to select a QAP that is likely to accept future admission control requests, but it does not represent a guarantee that these requests will be admitted.

Channel Load Application

Figure 3A:
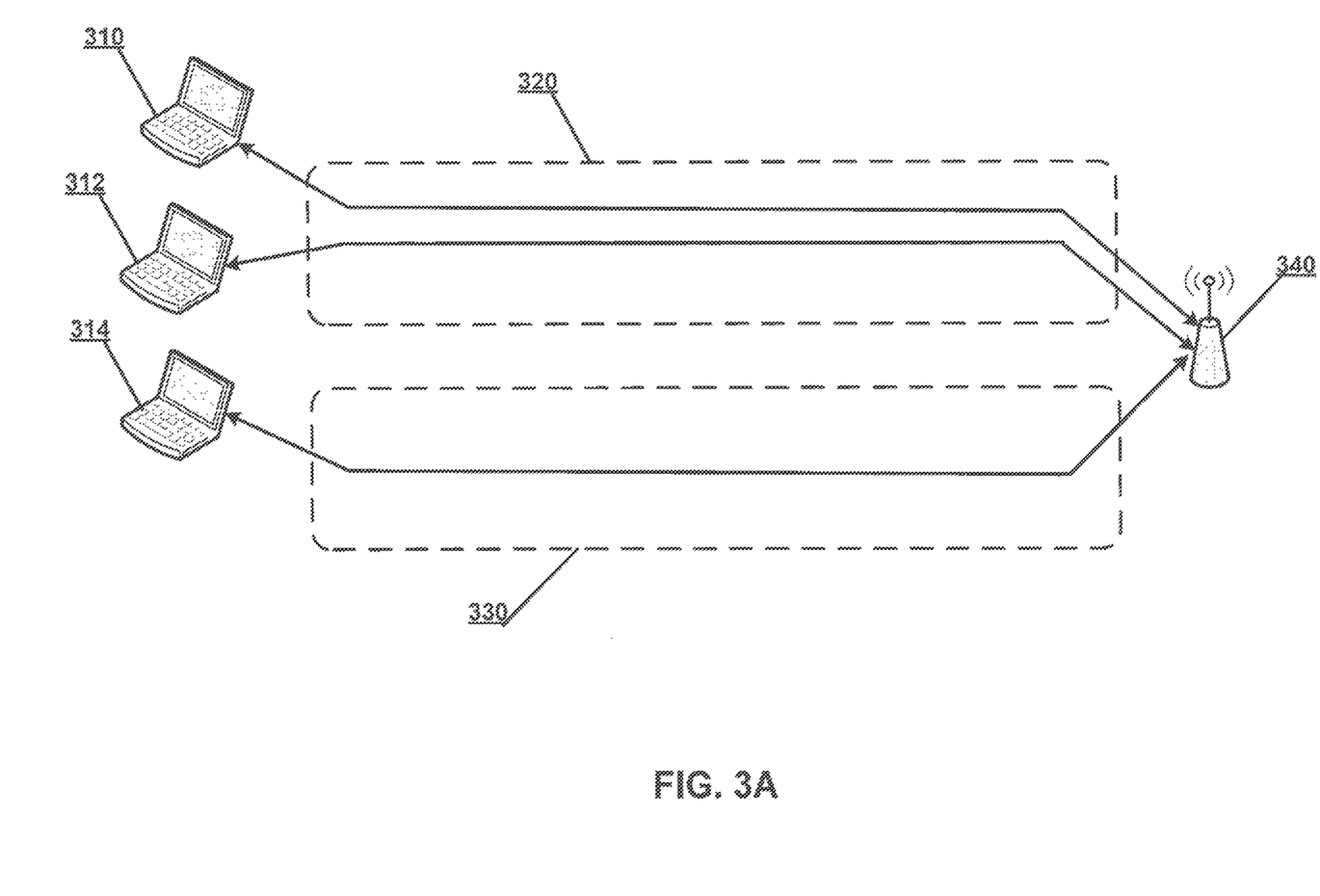
FIG. 3A shows a diagram illustrating network communication exchanges between client devices and network devices according to embodiments of the present disclosure.
Figure 3B:
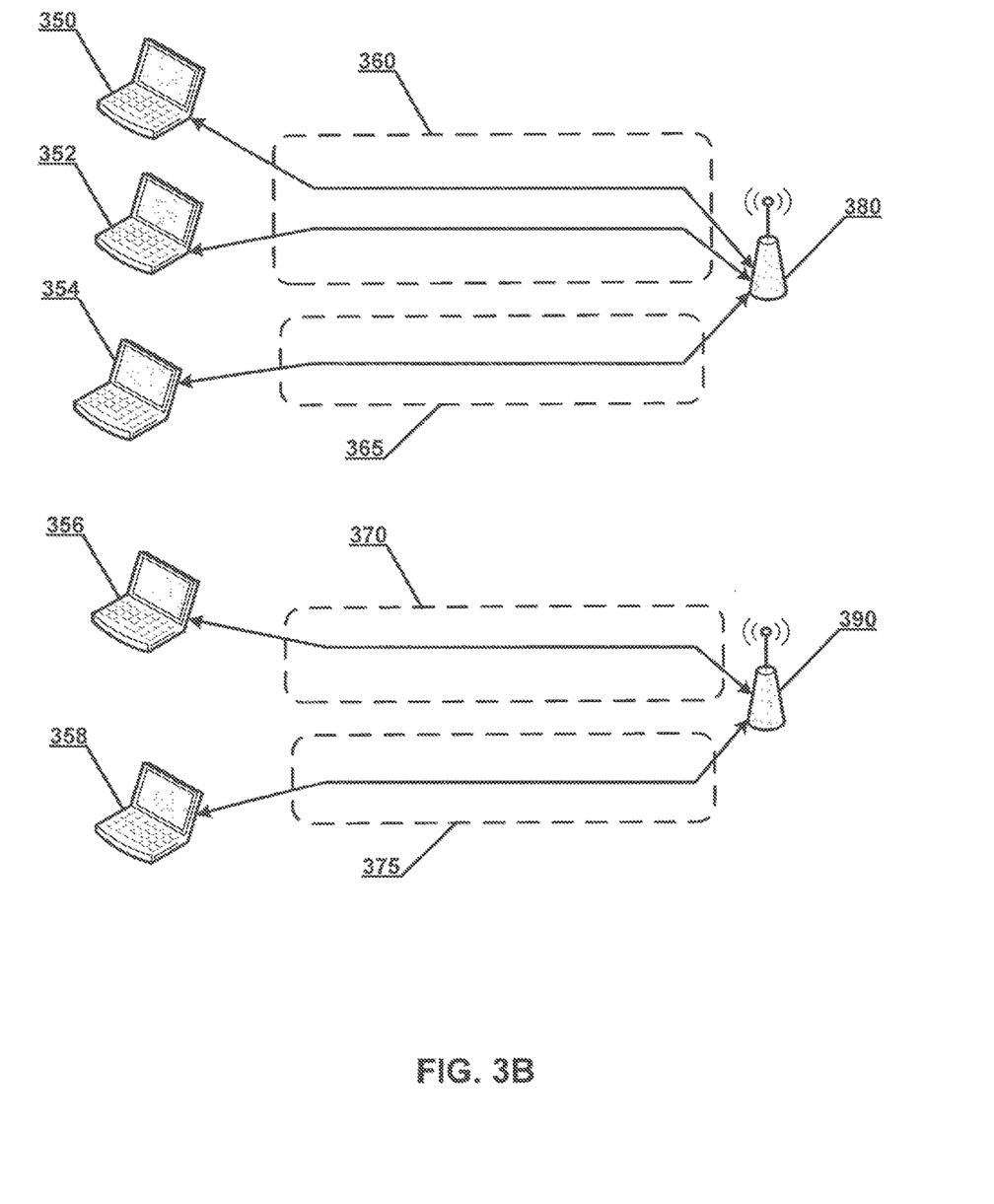
FIG. 3B shows a diagram illustrating network communication exchanges between client devices and network devices according to embodiments of the present disclosure.

FIGS. 3A and 3B show diagrams illustrating network communication exchanges between client devices and network devices. FIG. 3A includes access point 340, wireless stations 310, 312, and 314, and wireless networks 320 and 330, each of which is uniquely identified by a basic service set identifier. In the example illustrated in FIG. 3A, wireless stations 310 and 312 communicate with access point 340 through a first wireless network 320; and wireless station 314 communicates with access point 340 through a second wireless network 330.

Conventionally, in the illustrated example in FIG. 3A, when two wireless stations, such as stations 310 and 312, are associated with access point 340 on wireless network 320, access point 340 typically will include "2," i.e., the total number of associated wireless stations on wireless network 320, as the value for the station count field in QBSS element, and advertise the value to wireless stations on wireless network 320. Likewise, when one wireless station, such as station 314, is associated with access point 340 on wireless network 330, access point 340 typically will include "1," i.e., the total number of associated wireless stations on wireless network 330, as the value for the station count field in QBSS element, and advertise the value to wireless stations on wireless network 330. Thus, a wireless station, such as wireless station 314 which is associated with access point 340 on wireless network 330 via the same wireless communication channel as wireless network 320, may receive inaccurate QBSS load information that does not include loads of other wireless networks using the same wireless communication channel.

According to embodiments of the present disclosure, the number of wireless stations are aggregated based on the wireless communication channel that each wireless station uses. Moreover, the aggregated number for each wireless communication channel advertised to the wireless stations that are associated with or that are capable of associating with the access point on one or more wireless networks which are using the same wireless communication channel. Thus, accurate channel toad information will be transmitted from access points to wireless stations.

Specifically, the numbers of wireless stations (e.g., wireless stations 310 and 312) that are associated with an access point (e.g., access point 340) on different wireless networks 320 and 330 are aggregated based on the wireless communication channel being used. Therefore, the aggregated load for both wireless network 320 and wireless network 330 will be "3" in the example depict in FIG. 3A, because wireless networks 320 and 330 are using the same wireless communication channel. Accordingly, beacon frames or probe responses transmitted on both wireless network 320 and wireless network 330 will include "3" as the value for the station count in the QBSS element.

FIG. 3B shows another exemplary diagram illustrating network communication exchanges between wireless client stations and network devices, such as, access points, network routers, switches, or network controllers. FIG. 3B includes access points 380 and 390, wireless stations 350, 352, 354, 356, and 358, as well as wireless networks 360, 365, 370, and 375. In the example illustrated in FIG. 3B, wireless stations 350 and 352 communicate with access point 380 on a first wireless network 360 via a specific wireless communication channel; wireless station 354 communicates with access point 380 on a second wireless network 365 via the specific wireless communication channel; wireless station 356 communicates with access point 390 on a third wireless network 370 via the specific wireless communication channel; and wireless station 358 communicates with access point 390 on a fourth wireless network 375 via the specific wireless communication channel.

In the example depicted in FIG. 3B, each access point 380 or 390 may advertise or transmit an aggregated number of associated wireless clients, which are coupled to access points 380 or 390 in one or more wireless networks via the specific wireless communication channel. Access point 380 (or access point 390), upon receiving from another access point, e.g., access point 390 (or access point 380) the aggregated number of associated wireless clients on one or more wireless networks via the specific wireless communication channel, may further aggregate the total number of wireless clients associated with multiple access points via the specific wireless communication channel on the one or more wireless networks. Then, access point 380 or 390 can advertise the aggregated total number of wireless clients associated with multiple access points in the one or more wireless networks oh the specific wireless communication channel. Each access point 380 or 390 can advertise the aggregated load information to the wireless stations that are associated with or attempt to associate with the access point. Accordingly, a wireless station can acquire the load information not only of the access points it is associated or attempts to associate, but also of other neighboring access points in the wireless network operating on the same wireless communication channel.

Specifically, in FIG. 3B, wireless stations 350 and 352 are associated with access point 380 on wireless network 360 through a specific wireless communication channel. Thus, the total number of associated wireless stations on wireless network 360 is "2." Also, wireless station 354 is associated with access point 380 on wireless network 365 through the specific wireless communication channel. Thus, the total number of associated wireless stations on wireless network 365 is "1." Therefore, access point 380 will aggregate the total number of wireless stations on both wireless network 360 and wireless network 365 to generate the aggregated number of associated wireless stations on multiple wireless networks coupled to access point 380, all of which communicate on the specific wireless communication channel. In this example, the aggregated number would be "3." Accordingly, access point 380 will first advertise in both wireless network 360 and wireless network 365 "3" as the aggregated number of associated wireless stations on both wireless networks 360 and 365 via the specific wireless communication channel.

Likewise, wireless station 356 is associated with access point 390 on wireless network 370 via the specific wireless communication channel. Thus, the total number of associated wireless stations on wireless network 370 is "1." Moreover, wireless station 358 is associated with access point 390 through wireless communication channel 375. Thus, the total number of associated wireless stations on wireless network 375 is "1." Therefore, access point 390 will aggregate the total number of wireless stations on both wireless network 370 and wireless network 375 to generate the aggregated number of associated wireless stations on multiple wireless networks coupled to access point 390, all of which communicate on the specific wireless communication channel. In this example, the aggregated number would be "2." Accordingly, access point 390 will first advertise in both wireless network 370 and wireless network 375 "2" as the aggregated number of associated wireless stations on both wireless networks 370 and 375 is the specific wireless communication channel.

Additionally, in some embodiments, access point 380 or 390 also advertises its aggregated number of wireless stations respectively. Access point 380 or 390 receives channel load information from each other, and aggregates the received channel load information. For example, access point 380 receives "2" from access point 390 as the total number of wireless stations associated with access point 390 on wireless networks 370 and 375 via the specific wifeless communication channel. Also, access point 380 advertises "3" as the total number of wireless stations associated with access point 380 on wireless networks 360 and 366 is the specific wireless communication channel. Because, in this example, it is assumed that all of wireless networks 360, 365, 370, and 375 communicate on the same specific wireless communication channel, in some embodiments, access point 380 may further aggregate the number "2" received from access point 390 with the number "3" aggregated by access point 380 to generate a new aggregated number "5" (2+3=5) as the total number of associated wireless stations. Access point 380 can then advertise the new aggregated number to wireless stations on wireless networks 360 and 365 respectively.

Moreover, access point 380 can advertise the new aggregated number "5" over the air or transmit the new aggregated number to another network node. In some embodiments, when another network node such as access point 390 receives the new aggregated number (e.g., "5") from access point 380, access point 390 will advertise the new aggregated number to wireless stations on wireless networks 370 and 375 respectively.

As another example, access point 390 receives "3" from access point 380 as the total number of wireless stations associated with access point 380 on wireless networks 360 and 365 via the specific wireless communication channel. Also, access point 390 advertises "2" as the total number of wireless stations associated with access point 390 on wireless networks 370 and 375 via the specific wireless communication channel. Because, in this example, it is assumed that all of wireless networks 360, 365, 370, and 375 communicate on the same specific wireless communication channel, in some embodiments, access point 390 may further aggregate the number "3" received from access point 380 with the number "2" aggregated by access point 390 to generate a new aggregated number "5" (2+3=5) as the total number of associated wireless stations. Access point 390 can then advertise the new aggregated number to wireless stations on wireless networks 370 and 375 respectively, In this example, access point 380 can further advertise the new aggregated number "5" over the air or transmit the new aggregated number to another network node. In some embodiments, when another network node such as access point 380 receives the new aggregated number (e.g., "5") from access point 390, access point 380 will advertise the new aggregated number to wireless stations on wireless networks 360 and 365 respectively.

Although only two access points are depicted in FIG. 3B, it shall be noted that any number of access points and any level of aggregation can be supported without departing from the spirit of the present disclosure. However, it shall be noted that only the number of associated wireless stations on wireless networks using the same wireless communication channel are aggregated, and that the number of associated wireless stations on wireless networks that use different wireless communication channels will not be aggregated. In an alternative scenario, it is assumed that, in FIG. 3B, wireless network 375 communicates on a second and different wireless communication channel than wireless networks 360, 365, and 370. Accordingly, access point 390 will not aggregate the number of wireless stations on wireless network 370 with the number of wireless stations wireless network 375, because wireless networks 370 and 375 communicate on different wireless communication channels.

Therefore, access point 390 will advertise "1," which is the total number of associated wireless stations on wireless network 370 on the specific wireless communication channel, to wireless network 370 or over the air on the specific wireless communication channel. Likewise, access point 390 will advertise "1," which is the total number of associated wireless stations on wireless network 375 on the second and different wireless communication channel, to wireless network 375 or over the air on the second and different wireless communication channel.

Additionally, in some embodiments, when access point 380 receives the total number of associated wireless stations "1" on the specific wireless communication channel from access point 390, because both wireless networks 360 and 365 are on the same specific wireless communication channel, access point 380 can further aggregate the total number of associated wireless stations from access point 390 (i.e., "1") with the total number of associated wireless stations on wireless networks 360 and 365 as aggregated by access point 380 ("3"). As a result, access point 380 will generate a third aggregated number "4" (1+3=4) based on the aforementioned higher level of aggregation.

In yet another alternative scenario, it is assumed that, in FIG. 3B, wireless networks 365 and 375 both communicate on a second and different wireless communication channel than wireless networks 360 and 370. Accordingly, access point 390 will not aggregate the number of associated wireless stations on wireless network 370 with the number of associated wireless stations on wireless network 375, because wireless networks 370 and 375 communicate on different wireless communication channels. Likewise, access point 380 will not aggregate the number of associated wireless stations on wireless network 360 with the number of associated wireless stations on wireless network 365, because wireless networks 360 and 365 communicate on different wireless communication channels.

Hence, access point 380 will advertise "2" as the total number of associated wireless stations (which include wireless stations 350 and 352) as the load information to wireless network 360 as well as over the air via the specific wireless communication channel. Further, access point 380 will advertise "1" as the total number of associated wireless stations (which include wireless station 354) as the load information to wireless network 365 as well as over the air via the second and different wireless communication channel. On the other hand, access point 390 will advertise "1" as the total number of associated wireless stations (which include wireless stations 356) as the load information to wireless network 370 as well as over the air via the specific wireless communication channel. Also, access point 380 will advertise "1" as the total number of associated wireless stations (which include wireless station 358) as the load information to wireless network 375 as well as over the air via the second and different wireless communication channel.

In some embodiments, because wireless networks 360 and 370 are both on the specific wireless communication channel, access points 380 and 390 may receive each other's advertisement of load information via the specific wireless communication channel. That is, access point 390 can receive from access point 380 "2" as the load information on the specific wireless communication channel; and access point 380 can receive from access point 390 "1" as the load information on the specific wireless communication channel. The received load information may be further aggregated by either access point 380 or 390 to generate another aggregated number "3" (2+1=3), and this generated aggregated number "3" may be advertised by either or both access points 380 and 390 via the specific wireless communication channel.

Similarly, because wireless networks 265 and 375 are both on the second and different wireless communication channel, access points 380 and 390 may receive each other's advertisement of load information via the specific wireless communication channel. That is, access point 390 can receive from access point 380 "1" as the load information on the second and different wireless communication channel; and access point 380 can receive from access point 390 "1" as the load information on the second and different wireless communication channel. The received load information may be further aggregated by either access point 380 or 390 to generate another aggregated number "2" (1+1=2), and this generated aggregated number "2" may be advertised by either or both access points 380 and 390 via the second and different wireless communication channel.

The following table summarizes the three different scenarios described above (note that formula within parenthesis indicate that an aggregation is performed):

|  | Scenario 1 | Scenario 2 | Scenario 3 |
|---|---|---|---|
| Wireless Communication Channel I | Wireless networks 360, 365, 370, and 375 | Wireless networks 360, 365 and 370 | Wireless networks 360 and 370 |
| Wireless Communication Channel II | None | Wireless network 375 | Wireless networks 365 and 375 |
| Channel I Load Advertised by Access Point 380 in First Message | 3 (2 + 1 = 3) | 3 (2 + 1 = 3) | 2 |
| Channel II Load Advertised by Access Point 380 in First Message | 0 | 0 | 1 |
| Channel I Load Advertised by Access Point 390 in First Message | 2 (1 + 1 = 2) | 1 | 1 |
| Channel II Load Advertised by Access Point 390 in First Message | 0 | 1 | 1 |
| Channel I Load Advertised by Access Point 380 or 390 in Second Message | 5 (3 + 2 = 5) | 4 (3 + 1 = 4) | 3 (2 + 1 = 3) |
| Channel II Load Advertised by Access Point 380 or 390 in Second Message | 0 | 1 (0 + 1 = 1) | 2 (1 + 1 = 2) |

Note that, in some embodiments, access points 380 advertises a first message with load information that includes the total number of wireless stations associated with access point 380 on one or more wireless networks on the specific wireless communication channel; and access points 380 advertises a second message with load information that includes the total number of wireless stations associated with either access points 380 or with access point 390 on one or more wireless networks on the specific wireless communication channel. The first message and the second message may use a different format, or similar format but a different value to mark a field, in order to indicate that the second message includes load information associated with both access points 380 and 390 on the specific wireless communication channel. Thus, when either access point 380 or 390 receives the second message, access point 380 or 390 can recognize that the number in the second message indicates the aggregation of the total number of wireless stations associated with access point 380 and with access point 390. Accordingly, neither access point 380 nor 390 will further aggregate the number in the second message.

Channel Load Advertisement Process

Figure 4:
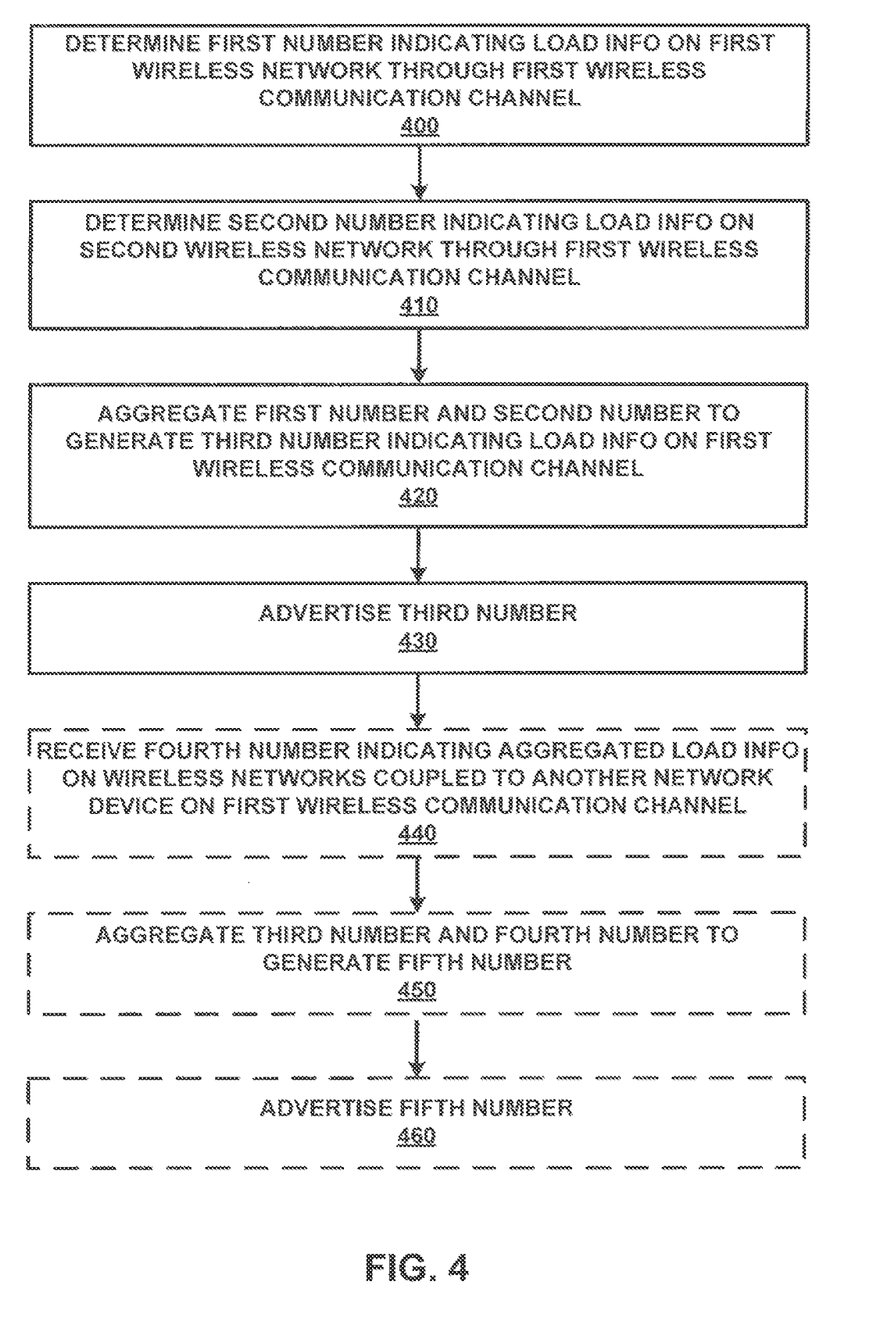
FIG. 4 snows a flowchart illustrating an exemplary process for advertising channel load at a network device according to embodiments of the present disclosure.

FIG. 4 shows a flowchart illustrating an exemplary process for advertising channel load at a network device. During operation, a network device, such as an access point, determines a first number indicating load information on a first wireless network through a first wireless communication channel (operation 400). Further, the network device determines a second number indicating load information on a second wireless network also through the first wireless communication channel (operation 410). The network device then aggregates the first number and the second number to generate a third number indicating load information on the first wireless communication channel (operation 420). Subsequently, the network device advertises the third number (operation 430). Note that the third number can be advertised either in beacon frames or in response to a received probe request. In some embodiments, the load information corresponds to the number of wireless stations associated with the network device (such as an access point) on the corresponding wireless network.

In some embodiments, the first wireless network and the second wireless network are coupled to the same network device. In other embodiments, the first wireless network and the second wireless network are coupled to different network devices, and the second number is determined based on a message received from another network device. In one embodiment, the other network device may advertise the second number in the message, which is received by the network device.

In some embodiments, the network device can optionally receive a fourth number indicating aggregated load information on one or more wireless networks coupled to another network device on the first wireless communication channel (operation 440). The network device can then further aggregate the third number and the fourth number to generate a fifth number (operation 450), and advertises the fifth number as the load information corresponding to the number of wireless at associated with both network devices on the first wireless communication channel (operation 460).

Figure 5:
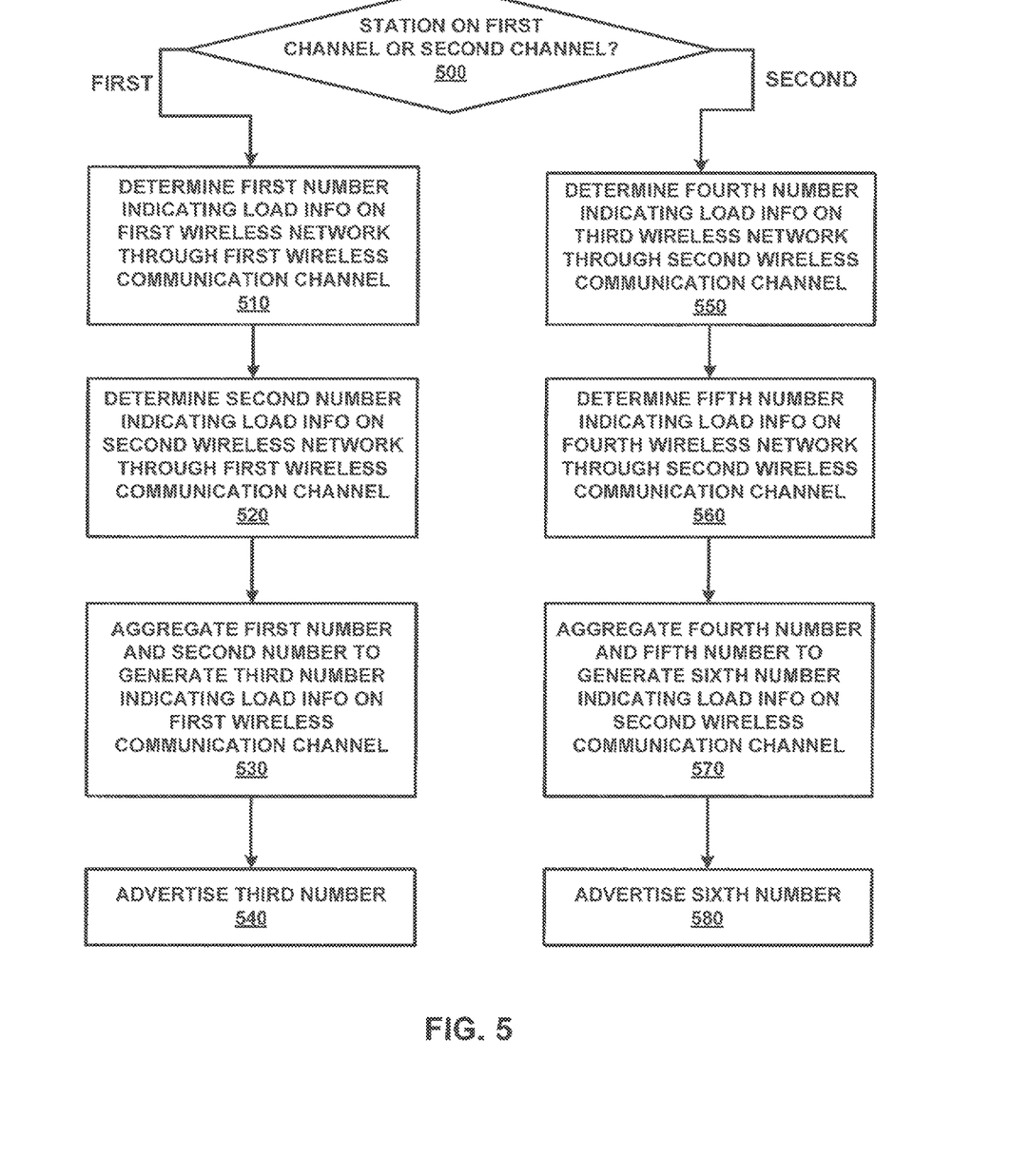
FIG. 5 shows a flowchart illustrating an exemplary process for advertising channel load at a network device according to embodiments of the present disclosure.

FIG. 5 shows a flowchart illustrating an exemplary process for advertising channel lead at a network device. During operation, a network device, such as a network controller, determines whether a wireless station is associated on a first wireless communication channel or a second wireless communication channel (operation 500). If the wireless station is associated on the first wireless communication channel, the network device then determines a first number indicating load information on a first wireless network through the first wireless communication channel (operation 510), and also determines a second number indicating load information on a second wireless network through the first wireless communication channel (operation 520). The network device then aggregates the first number and the second number to generate third number indicating load information on the first wireless communication channel (operation 530), and advertises the third number, i.e., the aggregated load information of at least the first wireless network and the second wireless network, on the first wireless communication channel (operation 540).

On the other hand, if the wireless station is associated on the second wireless communication channel, the network device Men determines a fourth number indicating load information on a third wireless network through the second wireless communication channel (operation 550), and also determines a fifth number indicating load information on a fourth wireless network through the second wireless communication channel (operation 560). The network device then aggregates the third number and the fourth number to generate sixth number indicating load information on the second wireless communication channel (operation 570), and advertises the sixth number, i.e., the aggregated load information of at least the third wireless network and the fourth wireless network, on the second wireless communication channel (operation 580).

In some embodiments, the network device may also optionally store the aggregated number of associated wireless clients on each wireless communication channel.

Channel Load Advertisement System

Figure 6:
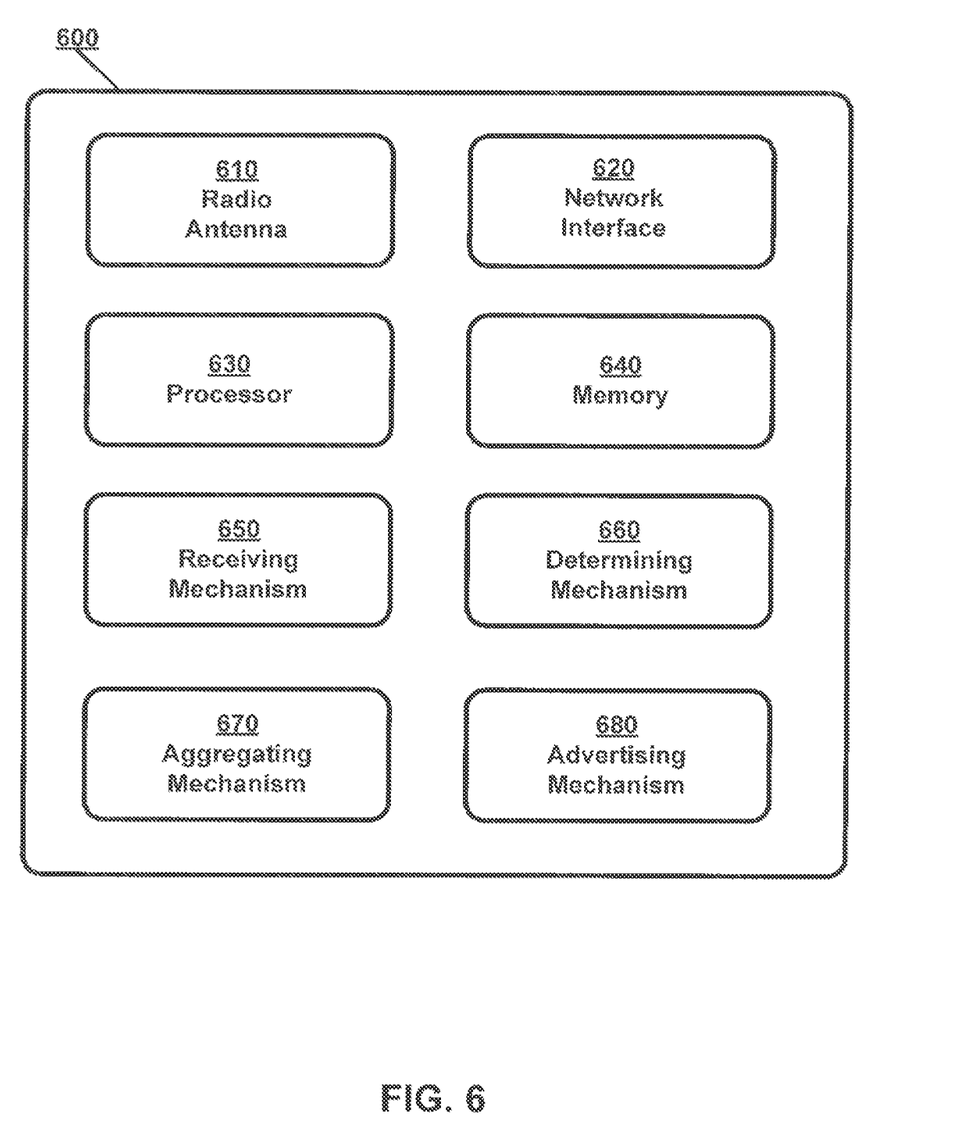
FIG. 6 is a block diagram illustrating a system tor advertising channel load according to embodiments of the present disclosure.

FIG. 6 is a block diagram illustrating a system for advertising channel load according to embodiments of the present disclosure.

Operating as a node in a wireless digital network, network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, an aggregating mechanism 670, an advertising mechanism 680, and a storing mechanism 690, all of which are coupled to processor 630 and memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc. In some embodiments, memory 640 stores one or more aggregated numbers of wireless client stations associated with one or more access points and/or controllers on one or more specific wireless communication channels.

Receiving mechanism 650 receives one or more network frames is network interface 620 or radio antenna 610. The received network frames may include, but are not limited to, requests and/or responses, beacon frames, management frames, control path frames, and so on, as described in the present disclosure. In some embodiments, receiving mechanism 650 can receive, a request from managed network device, such as a wireless station, on a specific wireless communication channel. In some embodiments, receiving mechanism 650 can receive an aggregated number from another network device, e.g., a management network device. The received number can indicate the number of wireless stations or clients that are associated with a plurality of wireless devices (e.g., access points) on the specific wireless communication channel, where the wireless devices (e.g., access points) are coupled to the management network device. In other embodiments, receiving mechanism 650 can receive from each of multiple network devices, such as access points, a number of wireless stations or clients that are associated with the network device on the specific wireless communication channel. In yet another embodiment, receiving mechanism 650 can receive the numbers of associated wireless stations or clients on multiple wireless communication channels respectively.

Determining mechanism 660 determines a first number indicating load information on a first wireless network that communicates through a first wireless communication channel. Moreover, determining mechanism 660 further determines a second number indicating load information on a second wireless network that communicates through the first wireless communication channel. In some embodiments, both the first wireless network and the second network are advertised by network device 600. In other embodiments, the first wireless network is advertised by network device 600, whereas the second wireless network can be advertised by another management network device, such as an access point. In some embodiments, the load information represents the number of wireless stations associated on the first wireless communication channel. In some embodiments, determining mechanism 660 further determines a third number indicating load information on a third wireless network that communicates through a second wireless communication channel, and a fourth number indicating load information on a fourth wireless network that communicates through the second wireless communication channel.

Aggregating mechanism 670 can aggregate a number of a plurality of wireless stations or clients that are associated with network device 500 on a specific wireless communication channel. In some embodiments, aggregating mechanism 670 can aggregate another number of a plurality of wireless stations or clients that are associated with network device 600 on a different wireless network operating on the same wireless communication channel.

Specifically, aggregating mechanism 670 can aggregate the first number with the second number to generate a third number indicating load information on the first wireless communication channel. Also, aggregating mechanism 670 can aggregate the fourth number with the fifth number to generate a sixth number indicating load information on the second wireless communication channel.

In some embodiments, aggregating mechanism 670 can aggregate the number of wireless stations or clients received from another management network device to generate an aggregated number indicating aggregated load information of multiple wireless networks coupled to multiple management network devices, where each of the multiple wireless networks operates on the same wireless communication channel.

Advertising mechanism 680 may advertise one or more aggregated numbers to a wireless station or client that is capable of associating with, or is associated with, or attempts to associate with network device 600 on a specific wireless communication channel. For example, advertising mechanism 680 may advertise the third number, which is generated by aggregating mechanism 670 and which indicates the aggregated lead information on the first wireless communication channel, in a first message over the first wireless communication channel. Furthermore, advertising mechanism 680 may advertise the sixth number, which is generated by aggregating mechanism 670 and which indicates the aggregated load information on the second wireless communication channel, in a second message over the second wireless communication channel. One or more aggregated numbers that indicate load information as measured by, e.g., the number of associated wireless stations or clients, may be optionally stored in memory 640 at network device 600. Each stored aggregated number indicates a total number of wireless stations or clients that are associated on a specific wireless communication channel with network device 600 or with multiple wireless networks that are coupled to network device 600.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out those methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, the term "wireless station," "client," "client station," "wireless client," "wireless client station," "STA," and/or "mobile device" may be used interchangeably to refer to any electronic device having the capability of moving location yet still communicating, no matter whether the movement and the communication occur during the same or different time periods.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the ad upon a reading of the specification and a study of the drawings are included within the true spirit and scope of the present disclosure, it is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. The description is this to be regarded as illustrative rather than limiting.

The invention claimed is:

1. A method comprising:
    determining a first channel load information indicating a number of wireless client devices in a first set of wireless client devices that are communicating on a particular wireless communication channel;
    advertising the first channel load information to at least one network device that is capable of associating within wireless client devices on the particular wireless communication channel;
    determining a second channel load information indicating a number of wireless client devices in a second set of wireless client devices that are communicating on the particular wireless communication channel;
    aggregating the first load information and the second load information to generate aggregated channel load information for the particular wireless communication channel;
    advertising the aggregated channel load information to at least one network device that is capable of associating within wireless client devices on the particular wireless communication channel;
    based on the aggregated channel load information for the particular wireless communication, preventing additional devices from communicating on the particular wireless communication channel.

2. The method of claim 1, wherein preventing the additional devices from communicating on the particular wireless communication channel comprises:
    reducing transmission power of beacon signals on the particular wireless communication channel.

3. The medium of claim 1, wherein preventing the additional devices from communicating on the particular wireless communication channel comprises:
    rejecting an association request on the particular wireless communication channel from a wireless client device.

4. The method of claim 3, wherein preventing the additional devices from communicating on the particular wireless communication channel comprises:
    rejecting the association request is in response to determining that the association request was received on the particular wireless communication channel.

5. The method of claim 1, wherein the channel load information for the particular wireless communication channel is based on at least one of: (1) a number of client devices communicating with the first access point on the particular wireless communication channel, (2) a number of wireless client devices transmitting and/or receiving data on the particular wireless communication channel that is above a threshold value, (3) an amount of data being transmitted on the particular wireless communication channel in a particular period of time, (4) an average amount of data being transmitted on the particular wireless communication channel in various time periods.

6. The method of claim 1, wherein the first load information identifies a total number of wireless client devices in the first set of wireless of wireless client devices, and wherein the second load information identifies a total number of wireless client devices in the second set of wireless client devices.

7. The method of claim 1, wherein the first load information indicates an amount of data transmitted to and from the first set of wireless client devices on the particular wireless communication channel, and wherein the second load information indicates an amount of data transmitted to and from the second set of wireless client devices on the particular wireless communication channel.

8. The method of claim 1, wherein the first set of wireless client devices comprises wireless client devices associated with a first access point, and wherein the second set of wireless client devices comprises wireless client devices associated with a second access point.

9. The method of claim 1, further comprising:
    advertising the channel load information for the particular wireless communication channel.

10. A network device comprising:
    a memory;
    a processor coupled to the memory, the processor executes instructions stored in the memory to:
        determine a first channel load information indicating a number of wireless client devices in a first set of wireless client devices that are communicating on a particular wireless communication channel;
        advertise the first channel load information to at least one network device that is capable of associating within wireless client devices on the particular wireless communication channel;
        determine a second channel load information indicating a number of wireless client devices in a second set of wireless client devices that are communicating on the particular wireless communication channel;
        aggregate the first load information and the second load information to generate aggregated channel load information for the particular wireless communication channel;
        advertise the aggregated channel load information to at least one network device that is capable of associating within wireless client devices on the particular wireless communication channel;
        based on the aggregated channel load information for the particular wireless communication, prevent additional devices from communicating on the particular wireless communication channel.

11. The network device of claim 10, wherein the processor further executes instructions stored in the memory to:
    reduce transmission power of beacon signals on the particular wireless communication channel.

12. The network device of claim 10, wherein the processor further executes instructions stored in the memory to:
    reject an association request on the particular wireless communication channel from a wireless client device.

13. The network device of claim 12, wherein the processor further executes instructions stored in the memory to:
    reject the association request is in response to determining that the association request was received on the particular wireless communication channel.

14. The network device of claim 10, wherein the channel load information for the particular wireless communication channel is based on at least one of: (1) a number of client devices communicating with the first access point on the particular wireless communication channel, (2) a number of wireless client devices transmitting and/or receiving data on the particular wireless communication channel that is above a threshold value, (3) an amount of data being transmitted on the particular wireless communication channel in a particular period of time, (4) an average amount of data being transmitted on the particular wireless communication channel in various time periods.

15. The network device of claim 10, wherein the first load information identifies a total number of wireless client devices in the first set of wireless of wireless client devices, and wherein the second load information identifies a total number of wireless client devices in the second set of wireless client devices.

16. The network device of claim 10, wherein the first load information indicates an amount of data transmitted to and from the first set of wireless client devices on the particular wireless communication channel, and wherein the second load information indicates an amount of data transmitted to and from the second set of wireless client devices on the particular wireless communication channel.

17. The network device of claim 10, wherein the first set of wireless client devices comprises wireless client devices associated with a first access point, and wherein the second set of wireless client devices comprises wireless client devices associated with a second access point.

18. The network device of claim 10, further comprising:
    wherein the processor further executes instructions stored in the memory to:
        advertise the channel load information for the particular wireless communication channel.

\* \* \* \* \*